(12) United States Patent
Zink et al.

(10) Patent No.: US 12,035,650 B2
(45) Date of Patent: Jul. 16, 2024

(54) CONTROL SYSTEM AND METHOD FOR OPERATING AN AGRICULTURAL MACHINE AS WELL AS AN AGRICULTURAL MACHINE

(71) Applicant: HORSCH LEEB Application Systems GmbH, Landau an der Isar (DE)

(72) Inventors: Florian Zink, Landau an der Isar (DE); Lena Fraundorfer, Landau an der Isar (DE)

(73) Assignee: HORSCH LEEB Application Systems GmbH, Landau an der Isar (DE)

(*) Notice: Subject to any disclaimer, the term of this patent is extended or adjusted under 35 U.S.C. 154(b) by 704 days.

(21) Appl. No.: 16/890,998

(22) Filed: Jun. 2, 2020

(65) Prior Publication Data

US 2020/0375086 A1    Dec. 3, 2020

(30) Foreign Application Priority Data

Jun. 3, 2019  (DE) .......................... 102019114869.3

(51) Int. Cl.
| | |
|---|---|
| *A01B 69/00* | (2006.01) |
| *A01B 67/00* | (2006.01) |
| *A01B 69/04* | (2006.01) |
| *A01B 79/00* | (2006.01) |
| *G05D 1/00* | (2006.01) |

(52) U.S. Cl.
CPC ............ *A01B 79/005* (2013.01); *A01B 67/00* (2013.01); *A01B 69/008* (2013.01); *G05D 1/021* (2013.01)

(58) Field of Classification Search
CPC .............................. A01B 67/00; A01B 69/008
See application file for complete search history.

(56) References Cited

U.S. PATENT DOCUMENTS

| | | | | |
|---|---|---|---|---|
| 6,315,658 | B1 * | 11/2001 | Weber ................ | G05B 13/0275 |
| | | | | 56/10.2 G |
| 7,502,678 | B2 | 3/2009 | Diekhans et al. | |
| 8,700,270 | B2 * | 4/2014 | Foster ................. | A01B 63/145 |
| | | | | 172/7 |
| 9,026,321 | B2 * | 5/2015 | Henry ................. | A01B 79/005 |
| | | | | 701/50 |
| 9,664,249 | B2 * | 5/2017 | Kowalchuk ........... | A01B 63/32 |
| 9,706,696 | B2 * | 7/2017 | Gschwendtner ..... | F16H 61/4043 |
| 9,883,626 | B2 * | 2/2018 | Heim ................... | A01C 21/005 |

(Continued)

FOREIGN PATENT DOCUMENTS

| | | |
|---|---|---|
| DE | 102017110159 A1 | 11/2018 |
| DE | 102017121654 A1 | 3/2019 |

(Continued)

*Primary Examiner* — Gary S Hartmann
(74) *Attorney, Agent, or Firm* — AVEK IP, LLC; Kent R. Erickson (57) ABSTRACT

A control system for an agricultural machine including at least one working implement for performing agricultural work processes includes a location determination module and a machine management module. The work processes can be planned by a planning module and transmitted to the machine management module or can be retrieved from a memory of the machine management module. In the control system, operational speeds are managed such that machine-specific load limits and environment-specific load limits are not exceeded.

18 Claims, 3 Drawing Sheets

(56) References Cited

U.S. PATENT DOCUMENTS

| | | | | |
|---|---|---|---|---|
| 2008/0257569 | A1* | 10/2008 | Foster | A01B 63/145 |
| | | | | 172/7 |
| 2014/0041563 | A1* | 2/2014 | Henry | A01B 79/005 |
| | | | | 111/139 |
| 2018/0220574 | A1* | 8/2018 | Peterson | A01B 79/00 |
| 2020/0367420 | A1* | 11/2020 | Hertzog | A01B 63/114 |
| 2020/0390023 | A1* | 12/2020 | Harmon | A01B 63/002 |

FOREIGN PATENT DOCUMENTS

| | | |
|---|---|---|
| DE | 102018108024 A1 | 10/2019 |
| EP | 1602267 A2 | 12/2005 |
| EP | 1847897 B1 | 10/2007 |

\* cited by examiner

CONTROL SYSTEM AND METHOD FOR OPERATING AN AGRICULTURAL MACHINE AS WELL AS AN AGRICULTURAL MACHINE

CROSS-REFERENCE TO RELATED APPLICATIONS

This application claims priority from German Application DE 10 2019 114 869.3, filed Jun. 3, 2019, the disclosure of which is hereby incorporated herein in its entirety by reference.

FIELD OF THE INVENTION

The invention relates to a control system of an agricultural machine as well as a method for operating an agricultural machine. The invention also relates to an agricultural machine, in particular an autonomous agricultural machine.

BACKGROUND

Agricultural machines are used to perform agricultural work processes. A wide range of working implements can be utilized for this purpose, which working implements can be controlled, regulated and/or parameterized particularly by means of a machine management system.

In addition, semi-autonomous or fully-autonomous agricultural machines and vehicles are increasingly finding their way into agricultural engineering. German patent application no. 10 2018 108 024, for example, was filed for such a vehicle.

To achieve optimum process results with the machine, it is commonly accepted to plan work processes in advance using a planning system, i.e. to define in advance, in particular location-specifically, which movements the working implements carrying out the work processes should perform.

EP 1 847 897 B1 discloses a method for controlling an agricultural machine system in which a route for the machine system is created using the planning system, the route comprising tracks and the tracks each being assigned work step sequences which are processed depending on the position so that a defined work process can be performed on reaching a defined position.

EP 1 602 267 A2 describes an agricultural machine, a working implement and a route planning system for generating routes or tracks on an area of agricultural land being assigned to the machine and the route planning system being designed to dynamically adapt routes. The dynamic adjustment being made based on optimization criteria, such as shortest travel distance/processing time or low proportion of non-productive auxiliary times.

Thus, agricultural machines are known from the prior art in which optimized routes are generated in each case by means of planning systems such as route planning systems, this being carried out in each case only from the aspect of the highest possible efficiency but not considering loads arising on the agricultural machine while travelling the routes or loads caused by the machine while performing agricultural work processes.

SUMMARY

It is thus the object of the invention to provide a machine with which disadvantages of customary techniques can be avoided. The object of the invention, in particular, is to provide a control system of an agricultural machine in which there is provision for consideration of machine-specific and environment-specific load limits.

This object is achieved by a control system and operational method of an agricultural machine. Advantageous embodiments and developments of the invention are disclosed in the description below with partial reference to the figures.

The invention relates to a control system of an agricultural machine. According to the invention, the control system comprises at least one location determination module. In addition, the control system comprises a machine management system for controlling, regulating and/or parameterizing working implements attached to the machine; control, regulation and/or parameter settings configured by means of a planning system being transmittable or transmitted to the machine management system.

The invention provides that load limits, in particular operational-speed-dependent load limits, of at least one working implement are stored in the planning system and/or in the memory of the machine management system and/or can be retrieved therefrom and the operational speed of the agricultural machine can be controlled, regulated and/or parameterized in such a manner that these load limits are not exceeded, preferably are not permanently exceeded.

As a result of the measures according to the invention, an agricultural machine with a control system is thus provided in which planning and definition of agricultural work processes (e.g. route planning) and corresponding operational speeds takes place in such a manner that machine-specific (e.g. strength limits) and/or environment-specific (e.g. drift limits) load limits cannot be exceeded. In particular, the control system according to the invention ensures that no operational speeds can be defined which could lead to damage to the machine or to environmental impacts.

The machine management system may be or comprise a control device which control device is designed for the transmission of electrical, hydraulic and/or pneumatic signals and commands. The machine management signal may alternatively or additionally comprise a computer unit and/or be connected or connectable to such a computer unit; it again being possible to store a control and/or regulating program for controlling, regulating and/or parameterizing the working implements in the computer unit.

The machine management system may expediently be designed in particular to control, regulate and/or parameterize the operational speed of the agricultural machine as a function of load limits in such a manner that neither machine-specific nor environment-specific load limits are exceeded.

The control system may comprise, and expediently may be connected to, in particular, a location determination module, for determining and defining the relevant location of the agricultural machine. The location determination module may be satellite-assisted and may be, for example, a GPS location determination device, a Galileo location determination device, a Glonass location determination device or a Beidou location determination device.

Alternatively or additionally, the location determination module may comprise an environment sensing system. The environment sensing system may comprise a radar device, a laser scanner device, a lidar device and/or a camera device. According to a preferred embodiment, the environment sensing system may, in particular, form a geofencing system.

The operational speed may be controlled, regulated and/or parameterized, in particular, by means of a work program stored in the planning system and/or in the machine management system, which work program is designed, in each case, to control, regulate and/or parameterize a corresponding operational speed as a function of the load limits.

To provide an autonomous (e.g. semi-autonomous or fully autonomous) agricultural machine, it may be provided according to a preferred variant of the embodiment that the work processes to be performed by this machine can be planned, in particular location-specifically, by means of a planning system and transmitted to the machine management system or can be retrieved from a memory of the machine management system and accordingly can be performed by the agricultural machine or by working implements attached to said agricultural machine.

The planning system may be detached, i.e. it is preferably not a direct component of the machine. The control, regulation and/or parameterization commands configured by means of the planning system being capable of transmission to the machine management system.

According to a further variant of the embodiment, the planning system may also be a component part of the machine management system, i.e. in particular an on-board system of said machine management system.

Expediently, the agricultural machine may be designed, in particular, as an autonomous agricultural machine, for example, as a semi-autonomous machine or as a fully autonomous machine. The machine may be a spreader and/or soil cultivation machine in which the working implement is a spreader boom (e.g. sprayer boom) with spreader elements or spreader nozzles attached thereto and/or a coulter bar with coulters attached thereto, and/or a frame construction with soil cultivation tools attached thereto. However, the machine may also be a harvesting machine (e.g. combine harvester, forage harvester) in which the working implement may be a harvesting attachment, for example. Alternatively, the machine may also be an agricultural tractor (e.g. tractor). The machine may be designed as a self-propelled machine. However, the machine may also be a machine pulled by means of a towing vehicle or a machine attached to a towing vehicle, where the control system, in particular, the machine management system, may be designed to control, regulate and/or parameterize work processes both of the machine and of the towing vehicle. The machine may thus be any kind of machine which is suitable for agricultural use.

One or more working implements, preferably performing movements brought about by means of motorized actuators, are attached to the agricultural machine depending on the work processes to be carried out by it. Which motorized actuators can be controlled, regulated and/or parameterized in particular by means of the machine management system.

The agricultural machine can be used to carry out a wide variety of work processes, it being possible to attach at least one working implement to the machine for this purpose. Examples of work processes are, for example, spreading of plant protection agents, distribution of seeds, spreading of fertilizer, soil cultivation, harvesting of crops, transporting agricultural goods, travelling along a route, in particular, one planned in advance by means of the planning system, with, in particular, a defined operational speed and/or pulling a working implement by an agricultural towing vehicle.

Depending on the respective working process, a wide variety of working implements may be attached in turn to the machine, in particular, working implements carrying out various work processes. The respective work processes to be carried out by the working implements may be coordinated in turn with each other, and in each case, it is possible to configure or define control, regulation and/or parameterization commands of a working implement depending on the control, regulation and/or parameterization commands of at least one further working implement by means of the planning system and/or by means of the machine management system.

Control of the motorized actuators may provide for the motorized actuators to be controlled by means of the machine management system and to initiate corresponding movements of the working implements or the actuators associated with the working implements depending on the control commands, in particular, no feedback being performed in this connection or no feedback taking place in this connection. In particular, this may mean that fixed input variables or input values of the motorized actuators are defined in each case by the planning system without taking into account whether they will also be reached while carrying out the work process.

Regulation of the motorized actuators may provide for the motorized actuators to be regulated by means of the machine management system, this taking place, in particular, depending on sensor-detected movements of the actuators and/or working implements. Regulation takes place expediently based on feedback of the movements performed by means of the motorized actuators and/or the working implements. For example, it may be possible to regulate the operational speed, it being possible to define location-specific operational speeds, for example, by means of the planning system and the motorized actuators being controlled according to these speeds until the desired location-specific operational speed is detected, for example by means of a speed sensor, and transmitted to the machine management system.

Parameterization may provide, for example, that setpoints (e.g. targets, work results, frequencies) of the work processes to be performed by means of the agricultural machine are defined and that the machine management system controls, regulates and/or parameterizes the actuators and/or the working implements based on this setpoint in such a manner that these setpoints are reached or observed.

For example, a working depth, a quantity of material to be spread, a kind of material to be spread, a power rating, a working width, a type of spreader element or a frequency (e.g. a so-called pulse width modulation spraying nozzle) may be specified as the setpoints.

Thus, the planning system can be used to configure control, regulation and/or parameterization parameters. In particular, the planning system can be used to configure location-specific control, regulation and/or parameterization parameters in such a manner that maximum load limits are not exceeded.

In addition, strength sensors (e.g. strain gauges) may be attached to the agricultural machine and/or work implements to detect load limits, where in turn load limits can be generated by the planning system and/or by the machine management system depending on the strength sensor system. Where this may preferably be done by the work program stored in the planning system and/or in the machine management system.

According to a preferred variant of the embodiment, the control system may provide that a maximum operational speed, a minimum operational speed and/or an operational speed range is configured as a function of load limits. Where the configuration may take place in particular by means of the machine management system and/or the planning system.

It is possible that the operational speed range is configured in such a manner that the at least one working implement can be controlled, regulated and/or configured within said range by the machine management system in such a manner that load limits are not exceeded. For example, this may mean that a working implement, for example, can be controlled and/or regulated, within variable ranges, for example, by motorized actuators, for example, in such a manner that their loads can be limited; this is the case, for example, in a damping system of a spreader boom (e.g. sprayer boom). Where the loads can only be limited in each case up to a certain range; if this range is exceeded, no further limitation is possible; in turn, depending on this range, an operational speed can then be defined which is defined in such a manner that limitation of the loads is still possible in each case.

According to a development of the invention, a maximum operational speed and/or an operational speed range may also be defined by a braking distance of the machine and/or by a deceleration of the machine, it again being possible for loads to be caused by braking or deceleration. In particular, it may thus also be provided that a maximum operational speed and/or an operational speed range are defined in such a manner that load limits are not exceeded or not permanently exceeded due to deceleration and/or gradual braking of the agricultural machine.

A further example for defining an operational speed range is offered, for example, by a height control of a spreader boom (e.g. sprayer boom) above agricultural land or above existing crops, where the height control, for example, may range between 10 cm and 60 cm, where in turn the higher the operational speed, the greater the drift (environment-specific load limit), i.e. if, for example, a height control of 10 cm is defined, the operational speed may in turn be higher than if the height control is 60 cm, as a result of which the operational speed range, for example, may in turn vary depending on a control and/or regulation range of the working implement.

A minimum speed may be defined, in particular, in such a manner that load limits are not exceeded but the highest possible efficiency is achieved by means of the agricultural machine.

According to an alternative or additional variant of the embodiment, high efficiency can also be achieved in that corresponding load limit ranges are also defined for the load limits. Thus, it may preferably be provided to define both a load limit range and an operational speed range and thus to coordinate them with each other in such a manner that the highest possible efficiency can be achieved by means of the agricultural machine.

In a further embodiment, the planning system may be computer-assisted and designed in such a manner that it can output and/or generate corresponding control, regulation and/or parameterization commands by specifying targets of an agricultural work process and/or by specifying work results of agricultural work processes, where outputting preferably takes place expediently in consideration of load limits.

According to a further variant of the embodiment, the planning system may include or comprise a graphic display device (e.g. terminal, mobile terminal, or the like). Where the graphic display may additionally or alternatively also be signal-connected and/or signal-connectable to the machine management system.

Working implements may be any assemblies, components, elements or the like by means of which agricultural work processes can be carried out indirectly and/or directly. Examples of such working implements are drive units, spreader units, soil cultivation tools, spreader booms (e.g. sprayer booms) or the like.

The motorized actuators may be formed, for example, by one or more electrical and/or hydraulic and/or pneumatic actuators, cylinders, actuating drives, motors or the like, which may also be part of the machine management system and/or be in signal and/or data transmission with the machine management system.

Machine-specific load limits may be defined as load limits. Where the machine-specific load limits may be defined, for example, by mechanical loads, thermal loads, power ratings, centrifugal force, gradient limits and/or the like.

Environment-specific load limits may also be defined as load limits. Where the environment-specific load limits may be defined by distance limits, drift limits, geographic data (e.g. boundaries), soil conditions, spectral properties, climatic conditions (e.g. weather data) and/or the like.

The load limits may be stored as fixed nominal values in the machine management system and/or in the planning system, and entered, for example, by an operator.

The load limits may be transmitted to the machine management system and/or the planning system from a database (e.g. data cloud) or may be retrieved from such a database.

The load limits may be generated computer-assisted, preferably by a work program, by means of the machine management system and/or by means of the planning system. As an example, a load limit based on a load of a component, which is detected by a sensor, may be mentioned here, where the work program may in turn be designed, for example, to define a load limit, for example a maximum permissible voltage, based on the load and the properties of the component.

According to a further variant of the embodiment, the load limits may also be defined by a combination of machine-specific load limits and environment-specific load limits. Where the definition takes place, in particular, by means of the planning system and/or by means of the machine management system.

Beyond this, the machine-specific load limits and the environment-specific load limits may mutually influence each other indirectly or directly. Thus, for example, the environment-specific load limits may change due to a change in machine-specific parameters. The machine-specific parameters may likewise change due to environment-specific parameters. For example, the higher the operational speed, the greater the drift, such that the machine-specific load limit of the operational speed may be or is defined by the environment-specific load limit.

According to a further variant of the embodiment, a minimum time of the load limits may be defined such that short-term violations of the load limits have no effect on the agricultural machine and/or the work processes performed by it. The minimum time, for example, may be at least 0.1 second or at least 1 second or at least 5 seconds.

According to a further variant of the embodiment, the load limits may be defined by a limit range. i.e. the load limits may cover a defined and/or definable limit range within which load limits have no effect on the agricultural machine and/or the work processes performed by it. This means that the load limits are defined by a limit range, as a result of which loads within this limit range have no effect on the agricultural machine and/or the work processes performed by it.

According to a further variant of the embodiment, it may be provided that the operational speed (maximum operational speed, minimum operational speed, operational speed range) defined as a function of load limits can be overridden, i.e. that an operational speed may be selectable in such a manner that load limits may be exceeded at least for a short time. It may be provided in this case that this can only take place if correspondingly enabled by defined operators.

It should also be noted that the terms "control" and "regulation" and "control device" may relate to electronic and/or pneumatic and/or hydraulic control systems which may perform control tasks and/or regulation tasks depending on their design. Even if the term "control" is used, it may also expediently cover "regulation" so to speak. Similarly, when the term "regulation" is used, it may also include "control" so to speak.

To avoid repetition, any features disclosed in connection with the control system shall also be deemed disclosed and claimable in accordance with the method and shall similarly be deemed disclosed and claimable for the agricultural machine. The above aspects and inventive features and variants of the embodiment, in particular with regard to the control system, thus also apply to the method and the agricultural machine. The same applies conversely, such that all aspects, inventive features and variants of the embodiment which are explained in connection with the method and the agricultural machine are accordingly also disclosed for the control system and are correspondingly claimable.

To achieve the objects, the invention also includes a method for operating an agricultural machine (e.g. autonomous or semi-autonomous agricultural machine).

The method comprises providing a location determination module.

The method also includes providing an agricultural machine with a machine management system for controlling, regulating and/or parameterizing working implements attached to the machine.

The method also covers planning of control, regulation and/or parameterization settings and transmission of the control, regulation and/or parameter settings to the machine management system.

In addition, the method includes defining and/or generating location-specific load limits and evaluating the planned location-specific work processes and evaluating maximum possible load limits.

The method also includes defining an operational speed of the agricultural machine in such a manner that load limits are not exceeded.

According to a preferred variant of the embodiment, the method also provides that a maximum operational speed, a minimum operational speed and/or an operational speed range is configured by the machine management system and/or the planning system as a function of the load limits.

The method may in particular provide that the operational speed range is configured in such a manner that the at least one working implement can be controlled, regulated and/or parameterized within said range by the machine management system in such a manner that load limits are not exceeded.

The invention also relates to an agricultural machine which comprises a control system as described herein and/or which is designed to carry out a method as disclosed herein.

The machine is preferably designed as an autonomous (e.g. semi-autonomous or fully autonomous) agricultural machine, in particular, as an autonomous soil cultivation and or spreader machine.

The preferred embodiments and features of the invention previously described may be combined with each other in any manner. Further details and advantages of the invention are described in the following with reference to the associated drawings. The scale of the individual elements in relation to each other in the figures do not always correspond to the real scale, as some shapes are simplified and other shapes are enlarged in relation to other elements for better illustration.

DETAILED DESCRIPTION

Figure 1:
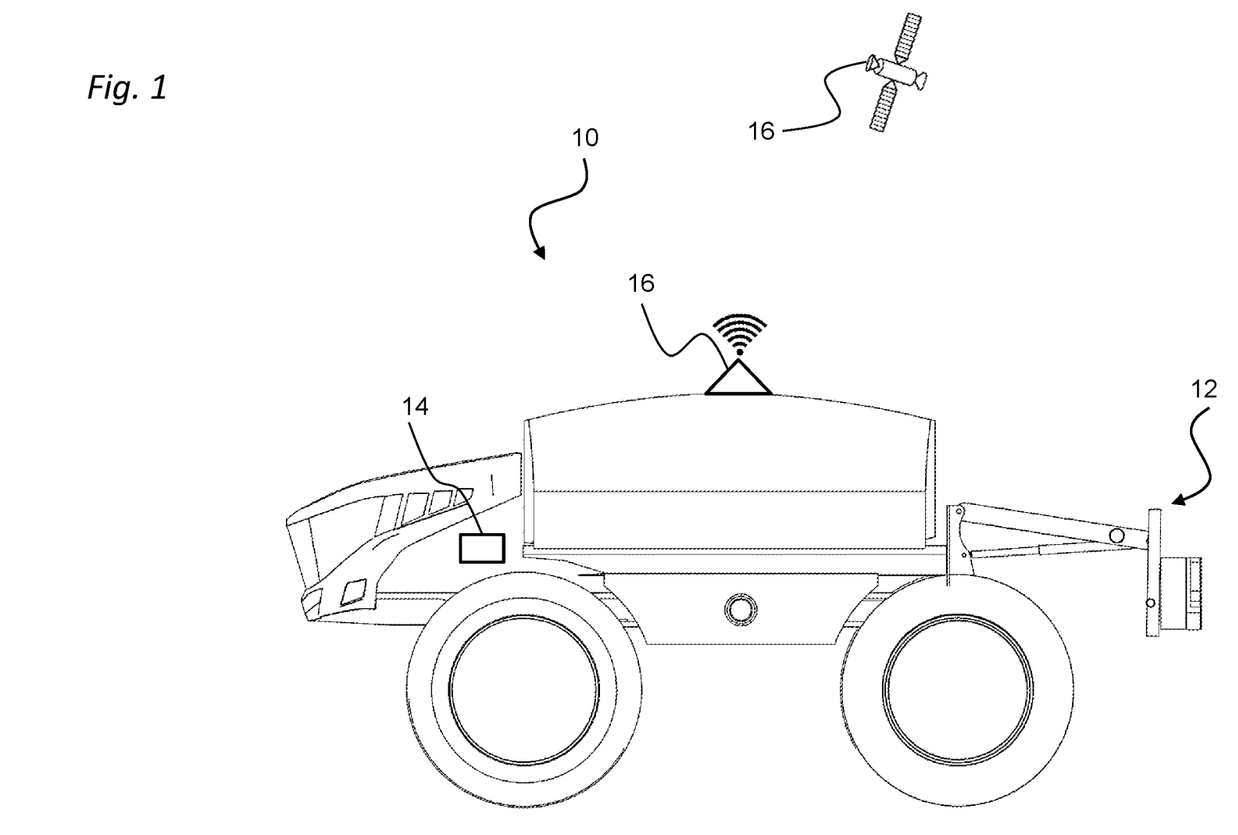
FIG. 1 a lateral view of a variant of the embodiment of an agricultural machine, FIG. 2 a schematic top view of agricultural land across which an agricultural machine is moved, FIG. 3 an exemplary process sequence of a method according to the invention for operating an agricultural machine.
Figure 2:
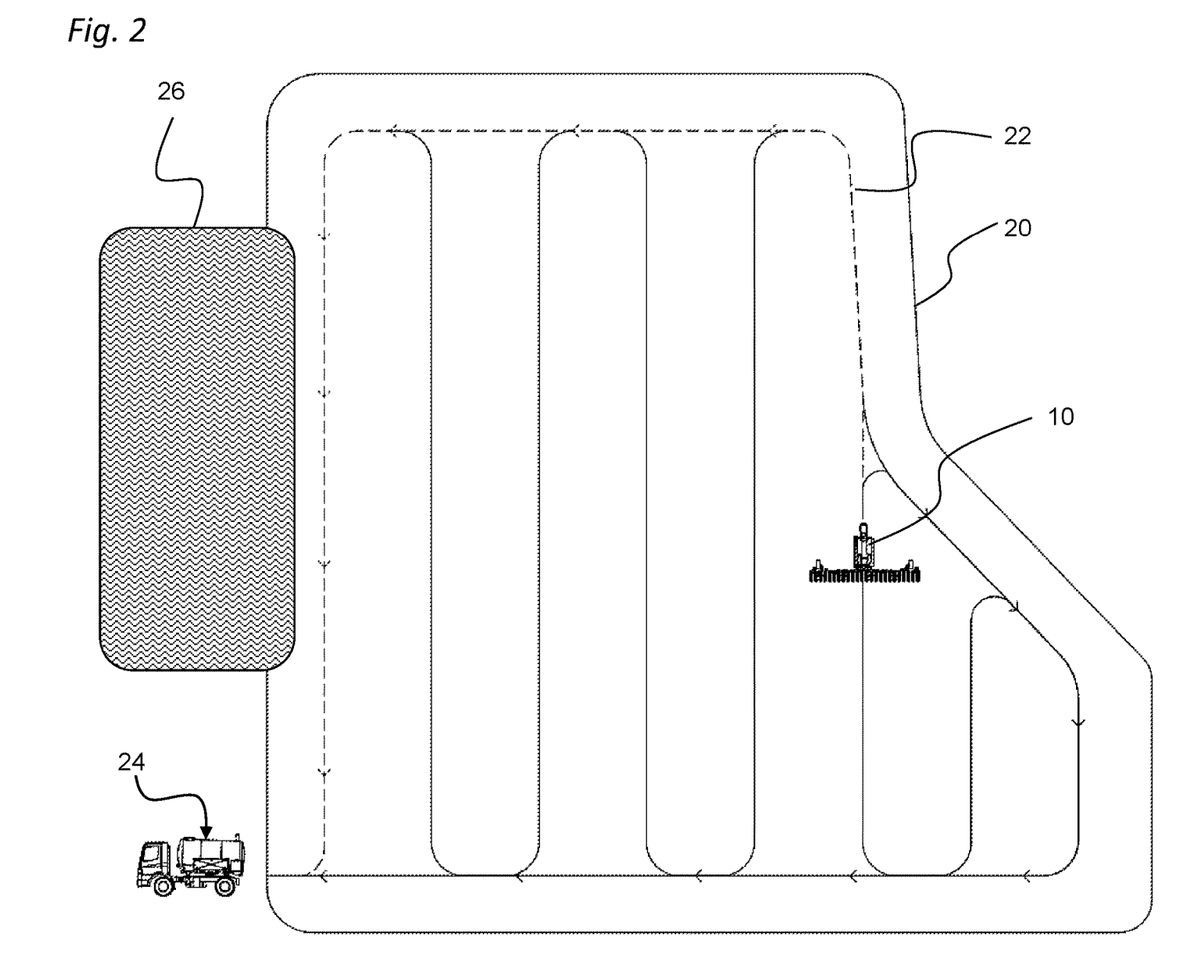
Figure 3:
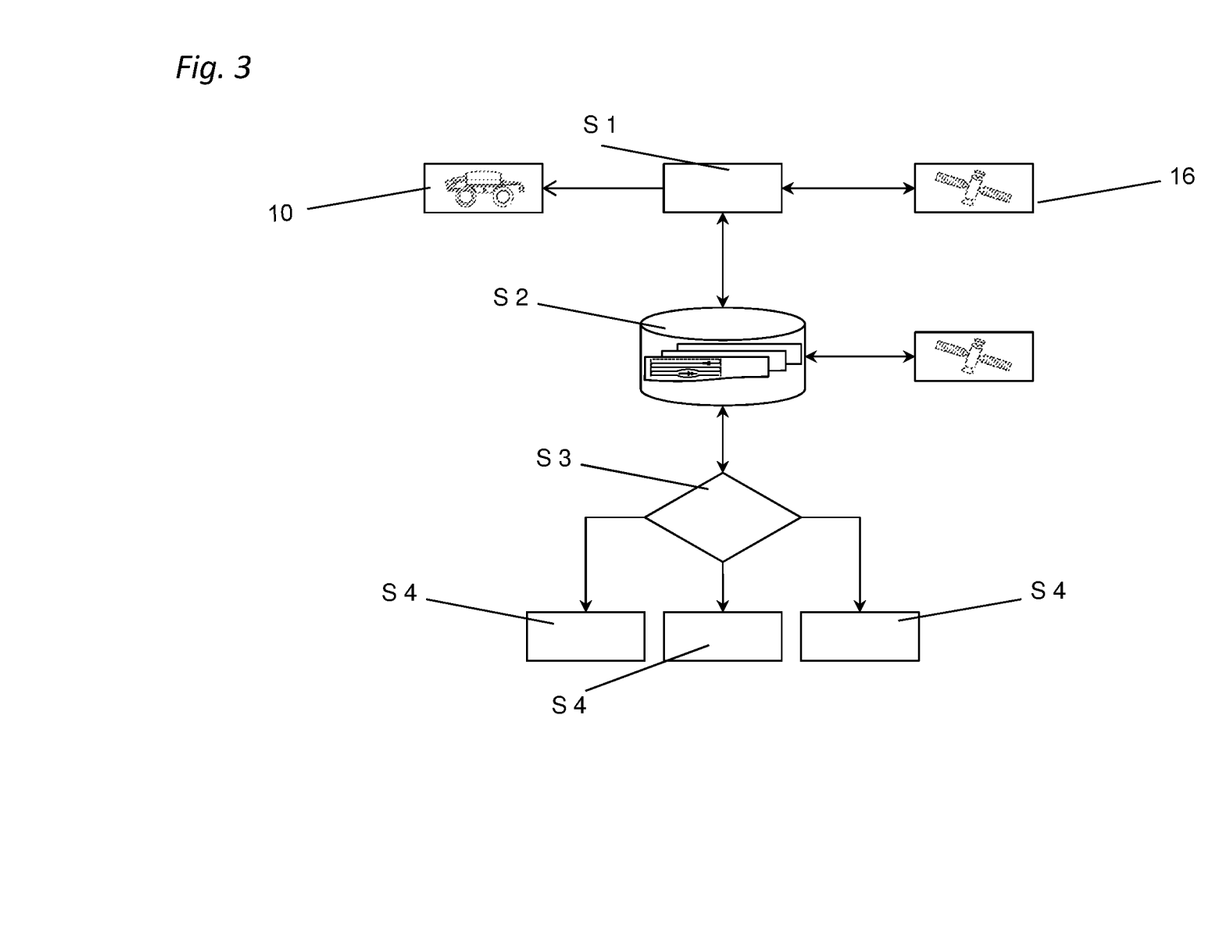

The embodiments shown in FIGS. 1 to 3 coincide at least in part such that similar or identical parts are provided with the same reference numbers and, for the explanation thereof, reference is also made to the description of the other embodiments and figures in order to avoid repetition. The embodiments illustrated merely represent examples of how the inventive control system, the inventive method and the inventive agricultural machine may be designed and executed and do not represent any conclusive limitation.

The lateral view of FIG. 1 shows a variant of the embodiment of an agricultural machine 10. The agricultural machine 10 is designed as an autonomous agricultural machine 10 in the form of a self-propelled autonomous spreader machine (field sprayer).

The field sprayer is used for carrying out agricultural work processes, expediently in particular for spreading in particular liquid media, e.g. fertilizers, crop protection agents or the like over agricultural land by means of a working implement 12 in the form of a spreader boom (sprayer boom) with spreader elements attached thereto (e.g. spreader nozzles or spraying nozzles).

It is possible that the agricultural machine 10 is not designed to be self-propelling but, for example, may be moved, preferably pulled, by a driven towing vehicle, e.g. a tractor. It is also possible that the agricultural machine 10 alternatively or additionally comprises soil cultivation tools and/or coulters as working implement 12.

For example, the machine 10 may alternatively be designed as a fertilizer spreader or a seeder. According to an alternative variant of the embodiment, the machine 10 may also be a machine for soil cultivation and/or sowing and, for example, comprise a working implement 12 for soil cultivation and/or sowing of agricultural seed, fertilizer or the like. The machine 10 may also be an autonomous carrier vehicle to which in turn soil cultivation tools, coulters or spreader boom (e.g. sprayer boom) or the like may be attached. The machine 10 may also be or have a towing vehicle (e.g. tractor) suitable for agriculture. A machine for soil cultivation and/or sowing or for spreading crop protection agents may in turn be attached to the towing vehicle or may be pulled by it over arable land. The machine 10 could also be a harvesting machine such as a forage harvester or combine harvester or the like. In general, the machine 10 may thus be any machine which is suitable for agricultural use.

The machine 10 comprises a control system with a machine management system 14 by means of which the working implements 12 (e.g. spreader boom) which perform the respective work processes and are attached to the machine 10 can be controlled, regulated and/or parameterized. The working implements 12 performing movements brought about by means of motorized actuators (e.g. motor, cylinder, actuator, actuating drive or the like), which actuators can be expediently controlled, regulated and/or parameterized by means of the machine management system 14, in particular can be expediently controlled, regulated and/or parameterized location-specifically (e.g. location-dependent).

For location determination or for determining the actual location of the agricultural machine 10, said machine also comprises a location determination module 16, in particular a satellite-assisted location determination device 16 (e.g. GPS location determination device, a Galileo location determination device, a Glonass location determination device or a Beidou location determination device).

FIG. 2 shows a schematic top view of agricultural land across which an agricultural machine 10, in particular, an autonomous agricultural machine 10 according to FIG. 1, is moved.

The machine 10 is moved within a boundary 20 of the useful area, along defined and/or definable routes 22. The routes 22 may be planned or predetermined by means of a planning system. In addition, work processes of the agricultural machine 10 may be planned location-specifically by means of the planning system and/or may be retrieved from a memory of the machine management system 14.

The planning system can also be used, for example to define the position of a supply vehicle 24 for the agricultural machine 10 such that in each case the position which the machine 10 should approach in each case, for example, when its filling level has reached a defined minimum.

A restricted area 26 (e.g. lake, river, road or similar) is shown adjacent to the area of agricultural land. The restricted area 26, for example, may be such that no crop protection agents may be applied over it or up to a defined minimum distance from it. It may be achieved by means of the planning system according to the invention that the work processes are planned and/or configured in such a manner that work processes correspondingly adapted to such restricted areas are carried out by the agricultural machine 10.

The control system preferably provides that, in particular, operational-speed-dependent load limits, of at least one working implement 12 are stored in the planning system and/or in the memory of the machine management system 14 and/or can be retrieved therefrom and that an operational speed of the agricultural machine 10 is limited in such a manner that the load limits (e.g. machine-specific load limits or environment-specific load limits) are not exceeded.

FIG. 3 shows an exemplary process sequence of a method according to the invention for operating an agricultural machine 10.

In a step S1, the method comprises providing a location determination module 16.

In addition, the method in step S1 comprises provision of an agricultural machine 10 with a machine management system 14 for controlling, regulating and/or parameterizing working implements 12 attached to the agricultural machine 10.

In step S2, the method comprises planning control, regulation and/or parameter settings and transmission of the control, regulation and/or parameter settings to the machine management system 14.

In step S3, the method comprises defining and/or generating location-specific load limits as well as evaluating the planned location-dependent work processes and maximum possible load limits.

In step S4, the method also comprises defining an operational speed of the agricultural machine in such a manner that load limits are not exceeded.

In this case, it may, in particular, be provided that the step S4 comprises defining a maximum operational speed or specifying a minimum operational speed or specifying an operational speed range within which the machine may be moved without exceeding load limits.

Although the invention has been described with reference to particular embodiments, it is apparent to a person skilled in the art that various changes can be made and equivalents can be used as a substitute without departing from the scope of the invention. In addition, many modifications can be carried out without departing from the associated scope. Consequently, the invention should not be limited to the embodiments disclosed but rather should include all embodiments falling within the scope of the appended claims. In particular, the invention also claims protection for the subject matter and the features of the dependent claims regardless of the claims referred to.

LIST OF REFERENCE NUMBERS

10 agricultural machine
12 working implement
14 machine management system
16 location determination module
20 boundary
22 route
24 supply vehicle
26 restricted area
S1-S4 method steps

What is claimed is:

1. An autonomous agricultural machine including a controller and at least one working implement, the controller being configured for planning and definition of agricultural work processes and comprising:
  a location determination module, and
  a machine management module for management of one or more of the following:
    controlling the at least one working implement, regulating the at least one working implement and parameterizing the at least one working implement,
  wherein:
  the at least one working implement is attached to the agricultural machine, one or more of control settings, regulation settings and parameterization settings are configurable by a planning module and are transmittable to the machine management module,
  load limits of the at least one working implement may be stored in one or both of the planning module and a memory of the machine management module and are retrievable therefrom, and an operational speed of the agricultural machine is manageable by the machine management module such that the load limits are not exceeded, and
  the planning module is computer-assisted and generates one or more of the control settings, regulation settings and parameterization settings based on setpoints of an agricultural work process, the agricultural work process at least partially comprising a route planning.

2. The agricultural machine according to claim 1, wherein an operational speed is configurable by the machine management module or the planning module as a function of the load limits.

3. The agricultural machine according to claim 1, wherein an operational speed range is configurable such that the at least one working implement is controlled or regulated within said range by the machine management module such that load limits are not exceeded.

4. The agricultural machine according to claim 1, wherein the at least one working implement is actuatable by motorized actuators managed by the machine management module, wherein the motorized actuators are controlled without feedback or the motorized actuators are regulated by feedback from movements of the actuators or of the working implements, such movements detected by sensors.

5. The agricultural machine according to claim 4, wherein the movements of the motorized actuators or the working implements are parameterized, parameterization comprising a setpoint of the work processes to be performed by the agricultural machine.

6. The agricultural machine according to claim 1, wherein the load limits are defined by machine-specific load limits.

7. The agricultural machine according to claim 1, wherein the load limits are defined by environment-specific load limits.

8. The agricultural machine according to claim 1, wherein the load limits are defined by machine-specific load limits and environment-specific load limits.

9. The agricultural machine according to claim 1, wherein the load limits are transmittable to one or both of the machine management module and the planning module from a database, or the load limits are generated by one or both of the machine management module and the planning module.

10. The agricultural machine according to claim 1, wherein a minimum time of the load limits is defined and short-term violations of the load limits have no effect on the agricultural machine or the work processes performed by the agricultural machine, wherein the minimum time is at least 5 seconds.

11. The agricultural machine according to claim 1, wherein the load limits are defined by a limit range such that loads within the limit range have no effect on the agricultural machine or the work processes performed by the agricultural machine.

12. The agricultural machine according to claim 1, wherein the agricultural machine is a spreader and the at least one working implement comprises a spreader boom with spreader nozzles attached thereto.

13. The agricultural machine according to claim 1, wherein the agricultural machine is a soil cultivation machine, wherein the working implement comprises:
   a coulter bar with coulters attached thereto, or
   a frame construction with soil cultivation tools attached thereto.

14. A method for operating the agricultural machine as in claim 1, comprising:
   providing the agricultural machine as in claim 1,
   planning of the one or more of control settings, regulation settings and parameter settings and transmitting of the one or more of control settings, regulation settings, and parameter settings to the machine management module,
   defining or generating load limits,
   evaluating the planned agricultural work processes and evaluating the load limits, and
   defining the operational speed of the agricultural machine such that the load limits are not exceeded.

15. The method according to claim 14, wherein a maximum operational speed, a minimum operational speed or an operational speed range is configured by the machine management module or a planning module as a function of the load limits, wherein the operational speed range is configured such that the at least one working implement is managed within said range by the machine management module such that the load limits are not exceeded.

16. A control system of an autonomous agricultural machine having at least one working implement attached thereto, the control system comprising:
   a location determination module,
   a planning module,
   a machine management module for controlling the at least one working implement using control settings configured by the planning module and transmitted to the machine management module, wherein
   operational-speed-dependent load limits of the at least one working implement are stored in the planning module or in a memory of the machine management module and are retrievable therefrom and an operational speed of the agricultural machine is controlled such that the load limits are not exceeded, and
   the planning module is computer-assisted and generates one or more of control, regulation and parameterization commands based on setpoints of an agricultural work process, the agricultural work process at least partially comprising a route planning.

17. The control system according to claim 16, wherein a maximum operational speed, a minimum operational speed or an operational speed range is configured by the planning module as a function of the load limits.

18. The control system according to claim 17, wherein the operational speed range is configured such that the at least one working implement is controlled within said range by the machine management module such that load limits are not exceeded.

* * * * *